US011927687B2

(12) United States Patent
Fan et al.

(10) Patent No.: US 11,927,687 B2
(45) Date of Patent: Mar. 12, 2024

(54) CENTRALIZED COOPERATIVE POSITIONING METHOD BASED ON JOINT TIME-SPACE PROCESSING

(71) Applicant: ZHEJIANG UNIVERSITY, Zhejiang (CN)

(72) Inventors: Chengfei Fan, Zhejiang (CN); Liyan Li, Zhejiang (CN); Yunlong Cai, Zhejiang (CN); Minjian Zhao, Zhejiang (CN); Xinglong Xu, Zhejiang (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 394 days.

(21) Appl. No.: 17/513,221

(22) Filed: Oct. 28, 2021

(65) Prior Publication Data

US 2022/0050167 A1   Feb. 17, 2022

Related U.S. Application Data

(63) Continuation of application No. PCT/CN2020/085733, filed on Apr. 20, 2020.

(30) Foreign Application Priority Data

Apr. 28, 2019 (CN) .......................... 201910349624.7

(51) Int. Cl.
G01S 5/02 (2010.01)

(52) U.S. Cl.
CPC .......... *G01S 5/0294* (2013.01); *G01S 5/0289* (2013.01); *G01S 2205/03* (2020.05)

(58) Field of Classification Search
CPC ... G01S 5/0294; G01S 5/0289; G01S 2205/03
USPC .................... 342/451, 453, 445, 160, 357.22
See application file for complete search history.

(56) References Cited

U.S. PATENT DOCUMENTS

| 2012/0007718 A1* | 1/2012 | Lee ...................... H01Q 1/2216 340/10.4 |
| 2017/0105322 A1* | 4/2017 | Kurz ................... H01L 23/3672 |
| 2018/0059235 A1* | 3/2018 | McLaughlin ........... G01S 13/20 |

OTHER PUBLICATIONS

WIPO, International Search Report for PCT/CN2020/085733, dated Jul. 15, 2020.

* cited by examiner

*Primary Examiner* — Bo Fan
(74) *Attorney, Agent, or Firm* — Hodgson Russ LLP

(57) ABSTRACT

A centralized cooperative positioning method includes: caching measurements of nodes in multiple time slices up to the current time slice; calculating location information of the nodes in the multiple time slices to obtain trajectory of the nodes in the multiple time slices; performing initial state estimations of the nodes based on measurements of a single time slice; and using the initial state estimations as initial solution values, performing the joint time-space processing on the measurements of the nodes in the multiple time slices based on trajectory constraints, to obtain a state estimation of each node at the current time slice, in which the state estimation includes an estimated value of a location of the node.

2 Claims, 2 Drawing Sheets

CENTRALIZED COOPERATIVE POSITIONING METHOD BASED ON JOINT TIME-SPACE PROCESSING

This application is a continuation of International Application No. PCT/CN2020/085733, filed on Apr. 20, 2020, which claims priority to Chinese Patent Application No. 201910349624.7, filed on Apr. 28, 2019, the entire disclosures of which are incorporated herein by reference.

FIELD

The disclosure belongs to the field of navigation, and more particularly, to a centralized cooperative positioning method based on joint time-space processing.

BACKGROUND

Real-time, high-precision location information is essential for many wireless networks such as wireless sensor networks, intelligent transportation systems and unmanned aerial vehicle (UAV) networks. Generally, a conventional positioning system such as a global navigation satellite system (GNSS) may provide these networks with high-precision location information. However, it is impractical to install a GNSS receiver for each node in the network due to cost and power consumption considerations. In addition, GNSS signals are susceptible to interference under harsh environments such as urban canyons, forests and tunnels. In this condition, the location information provided by GNSS differs greatly from the real location, which greatly reduces the positioning performance of GNSS. Cooperative positioning can effectively improve the positioning performance by employing cooperation among nodes in the network. In a cooperative positioning system, all nodes may be grouped into two categories: (1) reference nodes, which can obtain the prior knowledge of their positions via GNSS or other methods (2) user nodes, whose prior position information is not available because of no GNSS receiver or obstacle blocking or other reasons. The performance of cooperative positioning is closely related to a data fusion method used. The extended Kalman filter algorithm and the belief propagation algorithm are commonly used cooperative positioning methods. Other methods include the least squares algorithm and the maximum likelihood estimation algorithm. The cooperative positioning algorithm based on the extended Kalman filter algorithm has the low complexity, so it has been widely applied. It uses a linear system to approximate a nonlinear cooperative positioning system. The mismatch between the linear system and the original nonlinear system may greatly reduce the positioning performance of the system. The belief propagation algorithm based on factor graphs such as SPAWN (sum-product algorithm over a wireless network) algorithm is also widely applied. This algorithm may not take into account mobility constraints of nodes and is more sensitive to the accuracy of initial location information. Therefore, this algorithm may provide the higher positioning accuracy in a static or quasi-static network. However, when the algorithm is used in a high-mobility environment, errors of the initial location information may be relatively large, so its final positioning accuracy is also relatively low. The least squares algorithm or the maximum likelihood algorithm is asymptotically optimal under Gaussian white noise conditions. However, they cannot be directly applied because the objective problems are non-convex.

The aforementioned cooperative positioning methods may be roughly grouped into two categories: centralized methods and distributed methods. There is a central processing node in a centralized cooperative positioning system, which first collects available measurements of all nodes in the network and then localizes these nodes. In a distributed cooperative positioning system, each node collects measurements of neighboring nodes and localizes itself based on these measurements. In general, centralized algorithms have better positioning accuracy than distributed algorithms. However, when the centralized algorithms are applied to large networks, they may incur greater communication burden and computational complexity. At this time, the distributed algorithms may effectively reduce the communication burden and computational complexity at the expense of a certain positioning accuracy degradation. In addition, the aforementioned cooperative positioning algorithms only consider the measurements in the current time slice in each time slice. When the node has the relatively large velocity or the number of neighboring nodes is insufficient, the positioning accuracy of these algorithms is relatively poor and the positioning results are easy to diverge.

SUMMARY

The purpose of the disclosure is to provide a centralized cooperative positioning system and method based on joint time-space processing, for a situation that under harsh environments, some nodes in a high-mobility small wireless network may not he localized through the conventional positioning method such as GNSS and there may be insufficient node connections.

One aspect of the disclosure provides a centralized cooperative positioning system based on joint time-space processing. There are nodes and a central processing node in the system, and the central processing node is responsible for localizing all nodes. The central processing node has a multi-slice measurement cache module, a trajectory calculation module, an initial state estimation module and a joint time-space processing module measurements are used as input of the multi-slice measurement cache module and the initial state estimation module, a state variable of each node in a current time slice is used as input of the trajectory calculation module, and output of the multi-slice measurement cache module, the trajectory calculation module and the initial state estimation module are used as input of the joint time-space processing module, and output of the joint time-space processing module is used as result.

Another aspect of the disclosure provides a centralized cooperative positioning method based on joint time-space processing, including the following:

(1) during each time slice, caching, by the multi-slice measurement cache module which is used as a data cache module, all measurements of all nodes in the system in multiple time slices up to the current time slice, and sending these measurements into the joint time-space processing module;

(2) calculating, by the trajectory calculation module, location information of all the nodes in the system in the multiple time slices based on state variables of all the nodes in the system in the current time slice to obtain trajectory information of all the nodes in the multiple time slices, and sending the trajectory information of all the nodes into the joint time-space processing module;

(3) performing, by the initial state estimation module, initial state estimations of all the nodes in the system based on the measurements of a single time slice; sending the initial state estimations to the joint time-space processing module;

(4) using, by the joint time-space processing module, the initial state estimations provided by the initial state estimation module, as initial solution values, performing the joint time-space processing on the measurements of all the nodes in the system in the multiple time slices based on trajectory constraints, to obtain a state estimation of each node at the current time slice, in which the state estimation includes an estimated value of a location of each node.

The disclosure is based on the trajectory constraint of each node in the system and uses the central processing node to perform joint time-space processing on the measurements of all the nodes in the multiple time slices. By adding the time domain cooperation, the positioning accuracy of the node may be effectively improved. In addition, the disclosure may effectively improve the stability of the positioning result under harsh environments such as high velocity or few connection conditions.

DETAILED DESCRIPTION

Figure 1:
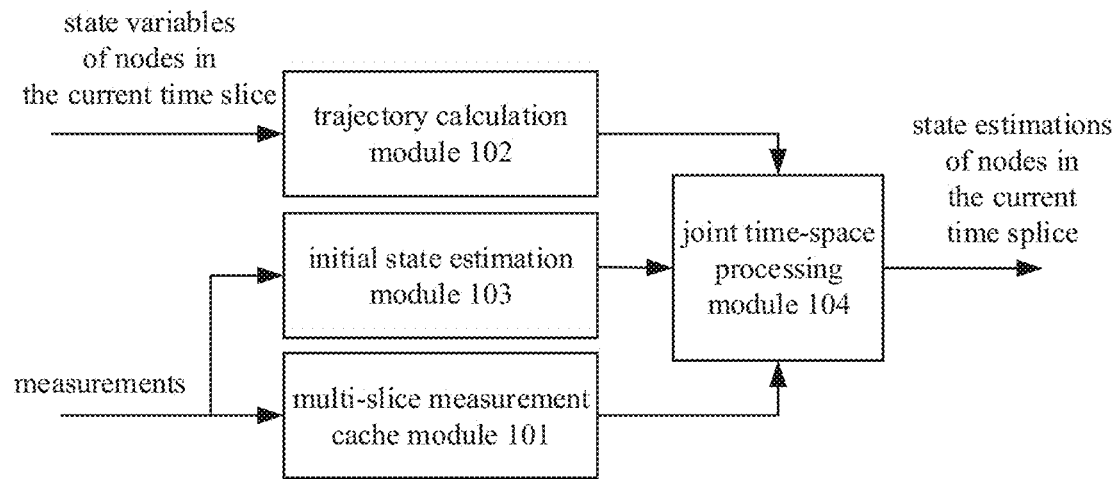
FIG. 1 is a block diagram of a centralized cooperative positioning method based on joint time-space processing.

The disclosure designs a centralized cooperative positioning system and method. The system aims to the problem that some nodes in the small mobile network may not complete self-positioning. The system uses location information of reference nodes and relative distance measurements among all nodes to complete positioning of all the nodes in the network. The proposed centralized cooperative positioning method, based on state information of each node at the current time slice, calculates trajectory information of the nodes in multiple time slices up to the current time slice. The joint time-space processing is performed on the measurements of all the nodes in the multiple time slices by using trajectory constraints of all the nodes, to obtain the location estimations of all the nodes at the current time slice. This method may effectively improve the positioning accuracy of nodes and the stability of the positioning results.

The central processing node in the centralized cooperative positioning system based on joint time-space processing includes the following four modules: a multi-slice measurement cache module, a trajectory calculation module, an initial state estimation module and a joint time-space processing module. The centralized cooperative positioning method designed for this system includes the following.

(1) A state model of the system is established and a measurement equation of the system is determined, as:

$$\tilde{x}_m^t = x_m^t + b_m^t;$$

$$r_{mn}^t = \|x_m^t - x_n^t\| + \mu_{mn}^t;$$

where $x_m^t$ represents a location of node m at time slice t, $\tilde{x}_m^t$ represents a location measurement of a reference node, $b_m^t$ represents a location measurement error; $r_{mn}^t$ represents a relative distance measurement between node m and node n, $\|x_m^t - x_n^t\|$ represents a true distance, and $\mu_{mn}^t$ represents a relative distance measurement error.

(2) During the current time slice k, location measurements $\tilde{x}^\mathcal{T}$ of reference nodes and relative distance measurements $r^\mathcal{T}$ among all the nodes in recent K time slices from time slice $\tau = k-K+1$ to the current time slice k may be cached as:

$$\tilde{x}^\mathcal{T} = [(\tilde{x}^k)^T, \ldots, (\tilde{x}^t)^T, \ldots, (\tilde{x}^\tau)^T]^T, \tilde{x}^t = [(\tilde{x}_1^t)^T, (\tilde{x}_2^t)^T, \ldots, (\tilde{x}_{N_\alpha}^t)^T]^T;$$

$$r^\mathcal{T} = [(r^k)^T, \ldots, (r^t)^T, \ldots, (r^\tau)^T]^T, r^t = [(r_1^t)^T, \ldots, (r_m^t)^T, \ldots, (r_M^t)^T]^T;$$

where $\mathcal{T} = \{\tau, \tau+1, \ldots, k\}$, $N_\alpha$ represents the number of the reference nodes, M represents the number of all the nodes, $r_m^t$ represents a set of relative distance measurements between node m and all neighboring nodes of node m. The measurements may be sent to the joint time-space processing module.

(3) Location information of all the nodes in previous K−1 time slices may be calculated based on state variables of all the nodes in the current time slice and mobility state variables of all the nodes such as velocity, acceleration. A velocity variable of node m in the current time slice k is defined as $v_m^k$ and an acceleration of node m in the current time slice k is defined as $\alpha_m^k$. In a case that a number of the considered multiple consecutive time slices is small, it is reasonable to assume that each node moves along a straight line with a constant acceleration in K time slices. At this time, based on the mobility state variable of the node in the current time slice k, location information of node m at time slice $t \in \mathcal{T}$, is defined as:

$$x_m^t = x_m^k + v_m^k \Delta T_t + \frac{1}{2} a_m^k (\Delta T_t)^2, m \in \mathcal{M}, t \in \mathcal{T};$$

where, $\Delta T_t = (t-k)\Delta T$, $\Delta T$ represents a length of the time slice. All the location information of node m from time slice $\tau$ to the current time slice k represents the trajectory of the node during the K time slices. The state variable of the node is defined as:

$$z_m^k = \left[(x_m^k)^T, (v_m^k)^T, (a_m^k)^T\right]^T.$$

The trajectory of node m is expressed as:

$$x_m^t = F^t z_m^k, m \in \mathcal{M}, t \in \mathcal{T};$$

$$F^t = \left[I_2, \Delta T_t I_2, \frac{1}{2}(\Delta T_t)^2 I_2\right].$$

The trajectories of all the nodes are sent to the joint time-space processing module.

(4) Initial state estimations of all the nodes may be calculated by the initial state estimation module, using the conventional cooperative positioning method based on the measurements in a single time slice such as extended Kalman filter algorithm and unscented Kalman filter algorithm. The initial state estimations of all the nodes may be used as initial solution values of the joint processing on the measurements in the multiple time slices. The initial state estimations of all the nodes may be sent to the joint time-space processing module.

(5) The joint time-space processing module may fuse the measurements of the multiple time slices based on the initial state estimations of all the nodes provided by the initial state estimation module and using trajectory constraints of all the nodes to obtain a state estimation of each node at the current time slice. In detail, $z^k=[z_1^k, z_2^k, \ldots, z_M^k]$ is defined and a maximum likelihood estimation of $z^k$ is obtained based the measurements $\tilde{x}^T$ and $r^T$ in the multiple time slices as:

$$(\hat{z}^k)_{MLE} = \arg\max_{z^k} p(\tilde{x}^T, r^T | z^k).$$

(6) The result of the joint time-space processing module is output, that is, a final state estimation each node at the current time slice may be obtained, which includes the estimated value of the location of each node.

The system block diagram of the cooperative positioning system is shown in FIG. 1, which includes a multi-slice measurement cache module 101, a trajectory calculation module 102, an initial state estimation module 103 and a joint time-space processing module 104. The measurements are used as input of the multi-slice measurement cache module 101 and the initial state estimation module 103. A state variable of each node in a current time slice is used as input of the trajectory calculation module 102. Output ends of the multi-slice measurement cache module 101, the trajectory calculation module 102 and the initial state estimation module 103 are coupled to an input end of the joint time-space processing module 104.

Embodiments

For an example, the extended Kalman filter algorithm is used as an initial estimation algorithm for node state information, measurements in K=3 time slices may be fused based on the maximum likelihood criterion, and SQP algorithm is used to solve the objective problem. It is se that there are 33 nodes in a mobile network, of which 13 nodes may obtain their own location information through GNSS. There is a certain error in the location information obtained through GNSS. The remaining nodes may not complete self-positioning, All nodes may be distributed randomly in an area of 2000 m×2000 m firstly. Due to the limitation of distance and power consumption and the presence of obstacles, each node may only communicate with a subset of the nodes in the network. The communication radius of each node is set to be 800 m herein. The relative distance information with neighboring nodes and the location information of neighboring nodes may be obtained through communication links. In addition, an initial velocity of all the nodes is set to 40 m/s and an acceleration meets a Gaussian distribution with a mean value of 0 m/s² and a standard deviation of 0.2 m/s². The standard deviation of the location error of the reference node, obtained through GNSS, is 4 m. The standard deviation of the relative distance estimation error between nodes is 1 m.

The central processing node in the centralized cooperative positioning system based on joint time-space processing includes the following four modules: a multi-slice measurement cache module, a trajectory calculation module, an initial state estimation module and a joint time-space processing module. The centralized cooperative positioning method designed for this system includes the following.

() A state model of the system is established and a measurement equation of the system is determined, as:

$$\tilde{x}_m^t = x_m^t + b_m^t;$$

$$r_{mn}^t = h(x_m^t, x_n^t) + \mu_{mn}^t = \|x_m^t - x_n^t\| + \mu_{mn}^t;$$

where $x_m^t$ represents a location of node m at time slice t, $\tilde{x}_m^t$ represents a GNSS measurement of a reference node, $b_m^t$ represents a location estimation error at time slice t and has a mean value of zero and a covariance matrix $U_m^t$; $r_{mn}^t$ represents a relative distance measurement between node m and node n, $h(x_m^t, x_n^t) = \|x_m^t - x_n^t\|$ represents a true distance, and $\mu_{mn}^t$ represents a relative distance measurement error and has a mean value of zero and a covariance matrix $(\sigma_{mn}^t)^2$.

(2) During the current time slice k, location measurements $\tilde{x}^T$ of reference nodes and relative distance measurements $r^T$ among all the nodes in recent K time slices from time slice $\tau = k-K+1$ to the current time slice k may be cached as:

$$\tilde{x}^T = \left[(\tilde{x}^k)^T, \ldots, (\tilde{x}^t)^T, \ldots, (\tilde{x}^\tau)^T\right]^T,$$

$$\tilde{x}^t = \left[(\tilde{x}_1^t)^T, (\tilde{x}_2^t)^T, \ldots, (x_{N_\alpha}^t)^T\right]^T;$$

$$r^T = \left[(r^k)^T, \ldots, (r^t)^T, \ldots, (r^\tau)^T\right]^T,$$

$$r^t = \left[(r_1^t)^T, \ldots, (r_m^t)^T, \ldots, (r_M^t)^T\right]^T;$$

where $\mathcal{T} = \{\tau, \tau+1, \ldots, k\}$, $N_\alpha$ represents the number of the reference nodes, M represents the number of all the nodes, $r_m^t$ represents a set of relative distance measurements between node m and all neighboring nodes of node m. The measurements may be sent to the joint time-space processing module.

(3) The measurements in the recent K time slices from the time slice $\tau$ to the current time slice k is related to the location of each node at the current time slice k and also related to the location of each node in the previous K−1 time slices. Therefore, location information of all the nodes in the previous K−1 time slices may be calculated based on state variables of all the nodes in the current time slice and mobility state variables of all the nodes such as velocity, acceleration. A velocity variable of node in the current time slice k is defined as $v_m^k$ and an acceleration of node m in the current time slice k is defined as $\alpha_m^k$. Considering that the measurements before a large number of time slices from the current time slice has little contribution to the positioning performance of the node at the current time slice, K is set to a small value, K=3. In this case, it is reasonable to assume that each node moves along a straight line with a constant acceleration in the K time slices. At this time, based on the mobility state of the node in the time slice k, location information of node m at time slice $t \in \mathcal{T}$, is defined as:

$$x_m^t = x_m^k + v_m^k \Delta T_t + \frac{1}{2} a_m^k (\Delta T_t)^2, m \in \mathcal{M}, t \in \mathcal{T};$$

where, $\Delta T_t = (t-k)\Delta T$, $\Delta T$ represents a length of the time slice. All the location information of node m from time slice $\tau$ to time slice k represents the trajectory of the node during the recent K time slices. The state variable of the node is defined as:

$$z_m^k = [(x_m^k)^T, (v_m^k)^T, (a_m^k)^T]^T.$$

The trajectory of node m is expressed as:

$$x_m^t = F^t z_m^k, m \in \mathcal{M}, t \in \mathcal{T};$$

where matrix $F^t$ is expressed as:

$$F^t = \left[I_2, \Delta T_t I_2, \frac{1}{2}(\Delta T_t)^2 I_2\right],$$

where $I_2$ represents a 2×2 unit matrix and the trajectory information of all the nodes are sent to the joint time-space processing module.

(4) In order to improve the efficiency of fusing the measurements in the multiple time slices, the initial state estimation module uses the extended Kalman filter algorithm to calculate initial state estimations of all the nodes based on the measurements in a single time slice, as initial solution values of trajectories of all the nodes during the information joint processing. A to-be-estimated variable at the current time slice is defined as $X_m^k = [(x_m^k)^T, (v_m^k)^T]^T$, where $x_m^k = [x_m^k, y_m^k]^T$, $v_m^k = [\dot{x}_m^k, \dot{y}_m^k]^T$. $X_m^k$ at the current time slice is predicted based on a posterior estimator $\hat{X}_m^{k-1}$ at time slice k−1 as:

$$\hat{X}_m^{k|k-1} = F\hat{X}_m^{k-1};$$

$$\hat{P}_m^{k|k-1} = F\hat{P}_m^{k-1}F^T + Q_m^k;$$

where matrix F is denoted as:

$$F = \begin{bmatrix} I_2 & \Delta T I_2 \\ 0_2 & I_2 \end{bmatrix};$$

$0_2$ represents a 2×2 all-zero matrix. $\hat{P}_m^{k-1}$ represents a covariance matrix of estimator $\hat{X}_m^{k-1}$, and $Q_m^k$ represents a covariance matrix of system modeling noise. A Jacobian matrix of the measurements $r_m^k$ about $X_m^k$ as:

$$H_m^k = \left[\frac{\partial r_m^k}{\partial x_m^k}, \frac{\partial r_m^k}{\partial y_m^k}, \frac{\partial r_m^k}{\partial \dot{x}_m^k}, \frac{\partial r_m^k}{\partial \dot{y}_m^k}\right];$$

a measurement residual and a covariance matrix of the measurement residual are calculated as:

$$\Delta r_m^k = r_m^k - h(\hat{x}_m^{k|k-1}, :);$$

$$S_m^k = H_m^k \hat{P}_m^{k|k-1} (H_m^k)^T + R_m^k;$$

where $h(\hat{x}_m^{k|k-1}, :) = \begin{bmatrix} h(\hat{x}_m^{k|k-1}, \hat{x}_{n_1}^k) \\ h(\hat{x}_m^{k|k-1}, \hat{x}_{n_2}^k) \\ \vdots \\ h(\hat{x}_m^{k|k-1}, \hat{x}_{n_{N_m}}^k) \end{bmatrix};$ $n_1, n_2, \ldots, n_{N_m}$ represents all neighboring nodes of node m. Matrix $R_m^k$ is a diagonal matrix as:

$$R_m^k = \text{diag}\{(\sigma_{mn_1}^k)^2, (\sigma_{mn_2}^k)^2, \ldots, (\sigma_{mn_{N_m}}^k)^2\}.$$

A Kalman gain is calculated as:

$$K_m^k = \hat{P}_m^{k|k-1}(H_m^k)^T(S_m^k)^{-1};$$

a posterior estimation and a covariance matrix of $X_m^k$ is calculated as:

$$\hat{X}_m^k = \hat{X}_m^{k|k-1} + K_m^k \Delta r_m^k;$$

$$\hat{P}_m^k = \hat{P}_m^{k|k-1} - K_m^k S_m^k (K_m^k)^T.$$

The estimations are used as the initial state estimations of the nodes and sent to the joint time-space processing module.

(5) The joint time-space processing module fuses the measurements in the multiple time slices using the trajectory constraints of all the nodes, based on the initial state estimations provided by the initial state estimation module, to obtain the state estimation of each node at the current time slice. In detail, $z^k = [z_1^k, z_2^k, \ldots, z_M^k]$ is defined as state of all the nodes at the current time slice k. A maximum likelihood estimation of $z^k$ is obtained based the measurements $\tilde{x}^\mathcal{T}$ and $r^\mathcal{T}$ in the multiple time slices as:

$$(\hat{z}^k)_{MLE} = \arg\max_{z^k} p(\tilde{x}^\mathcal{T}, r^\mathcal{T} \mid z^k).$$

Under the assumption of Gaussian white noise, the above equation is equivalent to a nonlinear least squares problem as:

$$\min_{z^k \in \mathbb{R}^{6M \times 1}} \sum_{\substack{t \in \mathcal{T} \\ m \in \mathcal{M}, n \in \mathcal{M} \setminus m}} \frac{c_{mn}^t}{(\sigma_{mn}^t)^2}(r_{mn}^t - \|x_m^t - x_n^t\|)^2 +$$

$$\sum_{t \in \mathcal{T}, m \in \mathcal{M}} (x_m^t - \tilde{x}_m^t)^T (U_m^t)^{-1}(x_m^t - \tilde{x}_m^t)$$

s.t. $x_m^t = F^t z_m^k, m \in \mathcal{M}, t \in \mathcal{T},$ $\|\dot{x}_m^k\| \leq v_{max},$ $\|a_m^k\| \leq a_{max}.$ M represents the number of all the nodes in the network. $c_{mn}^t = 1$ represents that node m and node n are connected, otherwise $c_{mn}^t = 0$.

(6) The above problem may be solved by using MATLAB's SQP algorithm to obtain a final state estimation of each node at the current time slice which includes the location estimation of each node.

Figure 2:
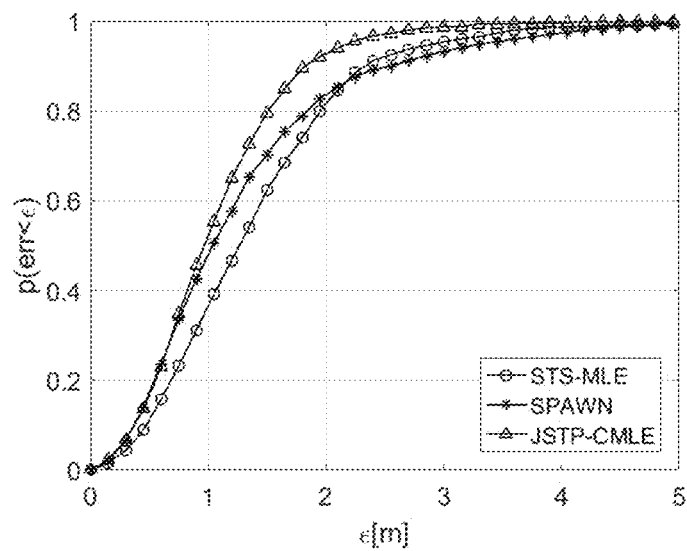
FIG. 2 is a graph of cumulative density of positioning errors of the user nodes.
Figure 3:
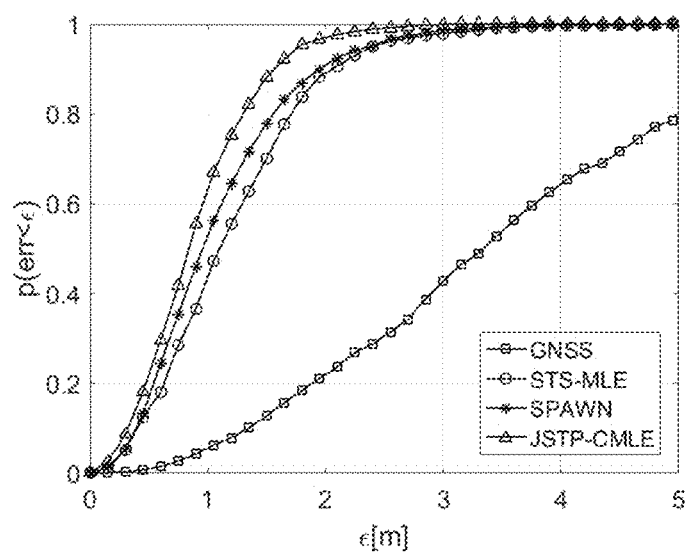
FIG. 3 is a graph of cumulative density of positioning errors of the reference nodes.

$e(x_m^k) = \|\hat{x}_m^k - x_m^k\|$ is defined as the positioning error of node m at time slice t, where $\hat{x}_m^k$ is the estimated value and $x_m^k$ is the real location. FIG. 2 is a graph of cumulative density of positioning errors of the user nodes and FIG. 3 is a graph of cumulative density of positioning errors of the reference nodes. JSTP-CMLE is a centralized cooperative positioning method based on joint time-space processing proposed by the disclosure. STS-MLE and SPAWN are two comparison methods. STS-MILE is a cooperative positioning method based on the measurements of the single time slice and the maximum likelihood criterion. SPAWN is a cooperative positioning method based on factor graph. "GNSS" in FIG. 3 represents a cumulative density curve of the positioning error of the reference node obtained by the conventional GNSS positioning method.

It can be seen from FIG. 2 and FIG. 3 that JSTP-CMLE may provide the higher positioning accuracy compared to comparison algorithms when used in the mobile network. In addition, based on GNSS observation information, these cooperative positioning methods may further improve the positioning accuracy of reference nodes. Specifically, RMSE=$\sqrt{\mathbb{E}\ \{e(x_m^k)^2\}}$ is defined as the mean square error of node positioning. For user nodes. RMSE of JSTP-CMLE is 1.2416 m, RMSE of STS-NILE is 1.6302 m, and RMSE of SPAWN is 1.6088 m; for reference nodes, RMSE of JSTP-CMLE is 1.0320 m, RMSE of STS-MLE is 1.3827 m, and RMSE of SPAWN is 1.2695 m.

What is claimed is:

1. A centralized cooperative positioning method of a centralized cooperative positioning system based on joint time-space processing, wherein there are nodes and a central processing node in the system and the central processing node is responsible for positioning all nodes; the central processing node comprises a multi-slice measurement cache module (101), a trajectory calculation module (102), an initial state estimation module (103) and a joint time-space processing module (104); measurements are used as input of the multi-slice measurement cache module (101) and the initial state estimation module (103), a state variable of each node in a current time slice is used as input of the trajectory calculation module (102), and output of the multi-slice measurement cache module (101), the trajectory calculation module (102) and the initial state estimation module (103) is used as input of the joint time-space processing module (104), and output of the joint time-space processing module (104) is used as result;

wherein the centralized cooperative positioning method comprises:

(1) during each time slice, caching, by the multi-slice measurement cache module which is used as a data cache module, all measurements of all nodes in the system in multiple time slices up to the current time slice, and sending the measurements into the joint time-space processing module;

(2) calculating, by the trajectory calculation module, location information of all the nodes in the system in the multiple time slices based on state variables of all the nodes in the system in the current time slice to obtain trajectory information of all the nodes in the multiple time slices, and sending the trajectory information of all the nodes into the joint time-space processing module;

in which (2) comprises:

calculating location information of each node in previous K−1 time slices based on a location variable $x_m^k$ of the node in the current time slice and a mobility state variable of the node, in a case that a number of the considered multiple consecutive time slices is small, it is reasonable to assume that each node moves along a straight line with a constant acceleration in K time slices, location information of node m at time slice t∈ $\mathcal{T}$, is defined, based on a mobility state of node m at time slice k, as:

$$x_w^t = x_m^k + v_m^k \Delta T_t + \frac{1}{2} a_m^k (\Delta T_t)^2, m \in \mathcal{M}, t \in \mathcal{T};$$

where, $v_m^k$ represents a velocity of node m at time slice k, $\alpha_m^k$ represents an acceleration, $\Delta T_t = (t-k)\Delta T$, $\Delta T$ represents a length of the time slice, and the above formula represents trajectory of node m from time slice τ to the current time slice k during the K time slices; the state variable of the node is defined as:

$$z_m^k = [(x_m^k)^T, (v_m^k)^T, (a_m^k)^T]^T;$$

the trajectory of node m is expressed as:

$$x_m^t = F^t z_m^k, m \in \mathcal{M}, t \in \mathcal{T};$$

$$F^t = \left[I_2, \Delta T_t I_2, \frac{1}{2}(\Delta T_t)^2 I_2\right];$$

where $I_2$ represents a 2×2 unit matrix and trajectories of all the nodes are sent to the joint time-space processing module;

(3) performing, by the initial state estimation module, initial state estimations of all the nodes in the system based on the measurements of a single time slice; sending the initial state estimations to the joint time-space processing module;

in which a to-be-estimated variable at the current time slice is defined as $X_m^k = [(x_m^k)^T, (v_m^k)^T]^T$, where $x_m^k = [x_m^k, y_m^k]^T$, $v_m^k = [\dot{x}_m^k, \dot{y}_m^k]^T$; $X_m^k$ at the current time slice is predicted based on a posterior estimator $\hat{X}_m^{k-1}$ at time slice k−1 as:

$$\hat{X}_m^{k|k-1} = F \hat{X}_m^{k-1};$$

$$\hat{P}_m^{k|k-1} = F \hat{P}_m^{k-1} F^T + Q_m^k;$$

where matrix F is denoted as:

$$F = \begin{bmatrix} I_2 & \Delta T I_2 \\ 0_2 & I_2 \end{bmatrix};$$

$0_2$ represents a 2×2 all-zero matrix, $\hat{P}_m^{k-1}$ represents a covariance matrix of estimator $\hat{X}_m^{k-1}$, $Q_m^k$ represents a covariance matrix of system modeling noise, a Jacobian matrix of the measurements $r_m^k$ about $X_m^k$ as:

$$H_m^k = \left[\frac{\partial r_m^k}{\partial x_m^k}, \frac{\partial r_m^k}{\partial y_m^k}, \frac{\partial r_m^k}{\partial \dot{x}_m^k}, \frac{\partial r_m^k}{\partial \dot{y}_m^k}\right];$$

a measurement residual and a covariance matrix of the measurement residual are calculated as:

$$\Delta r_m^k = r_m^k - h(\hat{x}_m^{k|k-1}, \cdot);$$

$$S_m^k = H_m^k \hat{P}_m^{k|k-1} (H_m^k)^T + R_m^k;$$

where $$h(\hat{x}_m^{k|k-1}, :) = \begin{bmatrix} h(\hat{x}_m^{k|k-1}, \hat{x}_{n_1}^k) \\ h(\hat{x}_m^{k|k-1}, \hat{x}_{n_2}^k) \\ \vdots \\ h(\hat{x}_m^{k|k-1}, \hat{x}_{n_{N_m}}^k) \end{bmatrix};$$

$n_1, n_2, \ldots, n_{N_m}$ represents all neighboring nodes of node m and matrix $R_m^k$ is a diagonal matrix as:

$$R_m^k = \text{diag}\{(\sigma_{mn_1}^k)^2, (\sigma_{mn_2}^k)^2, \ldots, (\sigma_{mn_{N_m}}^k)^2\};$$

a Kalman gain is calculated as:

$$K_m^k = \hat{P}_m^{k|k-1}(H_m^k)^T(S_m^k)^{-1};$$

a posterior estimation and a covariance matrix of $X_m^k$ is calculated as:

$$\hat{X}_m^k = \hat{X}_m^{k|k-1} + K_m^k \Delta r_m^k;$$
$$\hat{P}_m^k = \hat{P}_m^{k|k-1} - K_m^k S_m^k (K_m^k)^T;$$

the estimations are used as the initial state estimations of the nodes and sent to the joint time-space processing module;

(4) using, by the joint time-space processing module, the initial state estimations provided by the initial state estimation module, as initial solution values, performing the joint time-space processing on the measurements of all the nodes in the system in the multiple time slices based on trajectory constraints, to obtain a state estimation of each node at the current time slice, in which the state estimation includes an estimated value of a location of each node;

in which (4) comprises:

fusing, by the joint time-space processing module, the measurements in the multiple time slices using the trajectory constraints of all the nodes, based on the initial state estimations provided by the initial state estimation module, to obtain the state estimation of each node at the current time slice, in which the state estimation includes the estimated value of the location of the node, $z^k = [z_1^k, z_2^k, \ldots, z_M^k]$ is defined, M represents a number of all the nodes in the system, and a maximum likelihood estimation of $z^k$ is obtained based the measurements $\tilde{x}^T$ and $r^T$ in the multiple time slices as:

$$(\hat{z}^k)_{MLE} = \arg\max_{z^k} p(\tilde{x}^T, r^T | z^k).$$

2. The centralized cooperative positioning method according to claim 1, wherein (1) comprises:

during the current time slice k, caching, by the multi-slice measurement cache module, the measurements in all the K time slices up to the current time slice, in which the measurements include location measurements $\tilde{x}^T$ of reference nodes and relative distance measurements $r^T$ among all the nodes, $\mathcal{T} = \{\tau, \tau+1, \ldots, k\}$, $\tau = k - K + 1$; and the measurements are sent to the joint time-space processing module.

* * * * *